United States Patent [19]

Mayer et al.

[11] 4,320,984
[45] Mar. 23, 1982

[54] ARRANGEMENT FOR CONNECTING TWO STRUCTURAL PARTS

[75] Inventors: Siegfried Mayer, Vaihingen; Arno Altpeter, Sindelfingen, both of Fed. Rep. of Germany

[73] Assignee: Robert Bosch GmbH, Stuttgart, Fed. Rep. of Germany

[21] Appl. No.: 160,098

[22] Filed: Jun. 16, 1980

[30] Foreign Application Priority Data

Aug. 25, 1979 [DE] Fed. Rep. of Germany ....... 2934470

[51] Int. Cl.³ ............................................. F16B 7/00
[52] U.S. Cl. .................................. 403/292; 403/280; 403/266; 156/73.1
[58] Field of Search ................... 403/13, 14, 265–269, 403/276, 278, 280, 281, 292, 298, 408; 156/73.1, 73.2

[56] References Cited

U.S. PATENT DOCUMENTS

| 961,992 | 6/1910 | Underwood | 403/267 |
| 3,129,472 | 4/1964 | Hensel | 403/265 X |
| 3,480,306 | 11/1969 | Hsu | 403/281 |
| 4,003,665 | 1/1977 | Dreyer | 156/73.1 |

FOREIGN PATENT DOCUMENTS

| 2420461 | 11/1975 | Fed. Rep. of Germany | 403/292 |
| 1389819 | 4/1975 | United Kingdom | 156/73.1 |

*Primary Examiner*—Andrew V. Kundrat
*Attorney, Agent, or Firm*—Michael J. Striker

[57] ABSTRACT

An arrangement for producing a connection between two structural parts for preventing any relative movement thereof, consists of a blind bore in the one part and a through bore in the other part, a pin being inserted in fitting manner into the blind bore and projecting into the through-hole. Since the diameter of the through-hole is larger than the diameter of the blind bore an annular space is obtained within the through-hole which is filled out by a sleeve which is deformable through application of ultrasonic waves.

3 Claims, 2 Drawing Figures

ARRANGEMENT FOR CONNECTING TWO STRUCTURAL PARTS

BACKGROUND OF THE INVENTION

This invention relates to an arrangement for connecting two structural parts for preventing any relative movement.

It is generally known to provide a connection between two structural parts in such a manner that each part is provided with a respective bore hole which are in accurate alignment with each other. Connection between the two structural parts is achieved by inserting a pin into the bore holes. This arrangement, however, has the disadvantage that the provision of two bore holes in accurate alignment is rather complicated and frequently the bore holes are misaligned thereby requiring a reworking which leads to unnecessary expenses.

SUMMARY OF THE INVENTION

Accordingly, it is an object of the invention to overcome the difficulties of the prior art.

More particularly, it is an object of the invention to provide a connection of two structural parts in which the respective bore holes are not necessarily coaxial to each other.

Yet another object of the invention is to prevent any cumbersome reworking.

A concomitant object of the present invention is to provide a connection which is simple in construction, reliable in operation and inexpensive to manufacture nevertheless.

In keeping with these objects, and with others which will become apparent hereafter, one feature in the invention related to connecting two structural parts for preventing any relative movement, resides in developing a blind bore in one part, partially inserting a pin in fitting manner therein, developing in essentially coaxial manner to the blind bore a through-hole in the other part into which the remaining portion of the pin projects, and filling in any occurring free space within the through-hole.

Through the provision of such a connection, the individual bore holes can be produced separately thereby avoiding the need for special devices.

According to another feature of the invention, the part of the pin which projects into the through-hole is surrounded by a sleeve consisting of plastic which can be deformed by ultrasonic waves so as to fill in any free spaces caused by a misalignment of the two bore holes. Such a connection can be produced in an essentially cheaper way during mass production, since it is not necessary anymore to align the two bore holes in an accurate manner.

The novel features which are considered as characteristic are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
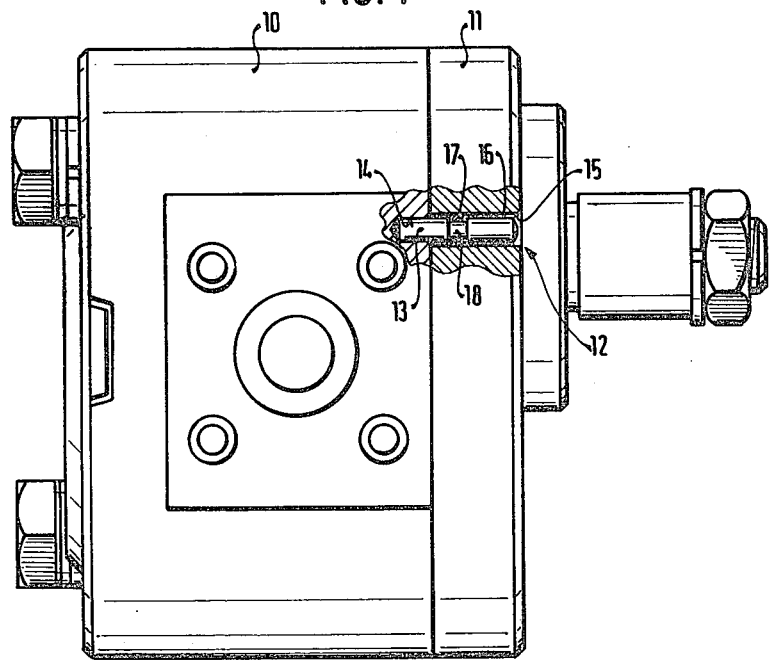
FIG. 1 shows a gear pump in which a first embodiment of a connection according to the invention is provided.

Referring firstly to FIG. 1, there is shown a gear pump having a casing 10 whose one end face is to be closed by a cover 11 in a tight manner. Thus, the cover 11 must fit together accurately with the housing 10 so that no adapting is required on both parts. Therefore, a safety connection 12 is provided which consists of a pin 13. The pin 13 is inserted in a fitting manner into a blind bore 14 arranged in the face end of the housing 10. It is to be noted that fitting either means slight fit or tight fit, i.e. a fit without any tolerance. In the cover 11, a smooth through-hole 15 is provided which is approximately coaxial to the blind bore 14. The through hole 15 has a diameter which is larger than the diameter of the blind bore 14, for example by 1.5 to 2 millimeter. Consequently, when the pin 13 is inserted into the blind bore 14 and is projecting into the through-hole 15, an annular space 16 is developed. In order to fill out this obtained annular space 16, a sleeve 17 is inserted into the through-hole 15 from the outside of the cover. The sleeve 17 is developed in the shape of a smooth hollow cylinder and consists of plastic wherein after being inserted within the through-hole 15, the sleeve 17 is deformed in such a manner by means of ultrasonic waves that the annular space 16 is completely filled in, thereby avoiding any clearance. This is necessary since in the case of slightly staggered bore holes, the annular space is not uniformly filled in by the sleeve 17. As can be seen from FIGS. 1 and 2, the pin 13 is integrally provided with an intermediate portion of smaller diameter. This arrangement permits a superior fixation of the pin 13 relative to the cover 11 since an annular recess 18 is developed which is filled out by the sleeve 17 after being inserted in the through-hole 15 and treated by ultrasonic waves.

Figure 2:
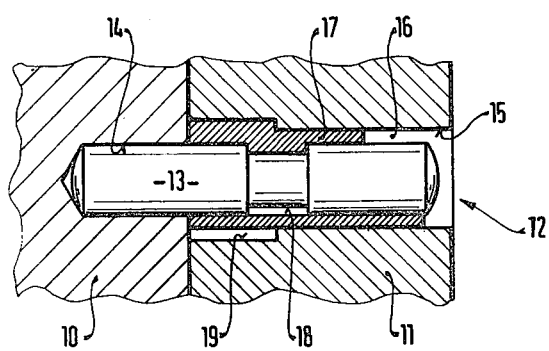
FIG. 2 is a cross-section of a second embodiment of the connection according to the invention depicting two different states of the connection.

Turning now to FIG. 2, in which a second embodiment of the connection is shown which differs essentially in that the through-hole 15 is developed as having a stepped portion 19 of greater diameter within the part of the cover 11 facing the end face of the casing 10. As can be seen from the lower part of the connection, the sleeve is also shaped as hollow cylinder which after the treatment with ultrasonic waves is filling out all intermediate spaces as can be seen from the upper part of FIG. 2.

It will be understood that each of the elements described above, or two or more together, may also find a useful application in other types of constructions of the connection of this invention differing from the type described above.

While the invention has been illustrated and described as embodied in a specific example of a safety connection, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Arrangement for connecting two structural parts while preventing relative movement thereof, comprising a blind bore in one part; a substantially coaxial through-hole in the other part; a separate pin partially inserted in fitting manner in the blind hole of the one part and having a remaining portion which extends into the through-hole of the other part so that a free space remains in the through-hole between the remaining portion of the pin and a body of the other part; and means for filling the free space in the through-hole of the other part, said filling means including an additional sleeve inserted into the through-hole of the other part so as to surround substantially the remaining portion of the pin, and deformed by ultra-sonic waves to thereby fill the free space in the through-hole of the other part, and wherein the pin is provided with an intermediate portion of smaller diameter arranged to be located within the through-hole of the other part and forming an inwardly extending annular recess in the region of the intermediate portion of the pin, and the through-hole of the other part being provided with a counterbore portion of larger diameter forming an outwardly extending recess in the other part and facing said one part, so that when the sleeve is deformed, the material of the sleeve displaces both inwardly and outwardly into the inwardly extending recess of the pin and outwardly extending recess of the other part; and wherein said inwardly extending recess and said outwardly extending recess are formed at axial locations which partially overlap one another.

2. Arrangement as defined in claim 1, wherein the sleeve consists of synthetic plastic.

3. Arrangement as defined in claim 1, wherein the sleeve is shaped as a smooth hollow cylinder.

* * * * *